INVENTOR.
ERNEST E. EATON
ATTORNEYS

May 1, 1962     E. E. EATON     3,031,898
SHIFT LEVER MECHANISM
Filed Dec. 28, 1959     2 Sheets-Sheet 2
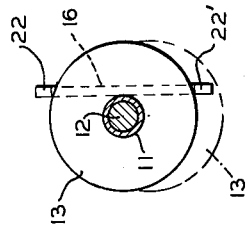
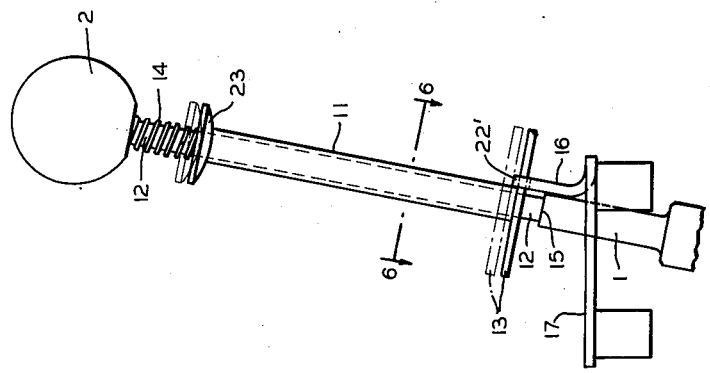
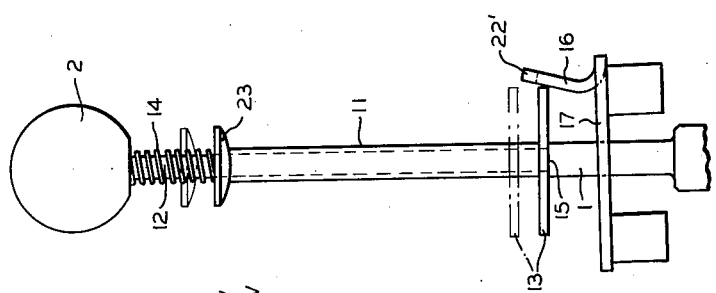
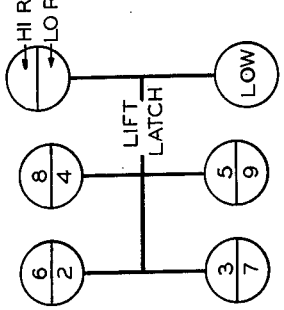
INVENTOR.
ERNEST E. EATON
BY
ATTORNEYS United States Patent Office 3,031,898
Patented May 1, 1962

3,031,898
SHIFT LEVER MECHANISM
Ernest E. Eaton, Jackson, Mich., assignor to Clark Equipment Company, a corporation of Michigan
Filed Dec. 28, 1959, Ser. No. 862,205
9 Claims. (Cl. 74—473)

This invention relates, in general, to shift lever mechanism, and has particular relation to latch means for shift lever mechanism for automotive transmissions, wherein there is a gear shift lever for selectively providing different ratios of forward drive and reverse drive or drives through the transmission.

It is common to have a shift lever which is adapted to be shifted, for example, to one side of the shift pattern and then rearwardly or forwardly to different drive positions, such as low drive in one direction and reverse drive in the opposite direction.

One of the features of the present invention resides in the provision of latch mechanism which is operative, unless released, firstly, to prevent movement of the lever laterally to position for shifting, for example, to the low drive or reverse positions, and which, secondly, is operative when the lever is in either the low position or the reverse position to prevent the operator from accidentally shifting the lever to the reverse position or to low position, respectively.

Another feature resides in the provision of an improved form of latch mechanism having a first latching position for preventing movement of the lever to position for shifting into the different drive positions, and a second latching position as it is shifted from one of the different drive positions to prevent accidental movement of the lever to the other of the different drive positions.

Another feature resides in the provision of spaced stop portions and latch means having a latching position between the spaced stop portions as the lever is shifted from one of its different drive positions to prevent accidental movement of the lever to another of its different drive positions.

Another feature resides in the provision of a tubular member slidable on the shift lever and having a generally disc-like member for cooperation with stop means mounted in proximity of the lever, a coiled spring surrounding the lever, and acting endwise on the tubular member yieldingly to urge the generally disc-like member to latching position, and a finger-piece on the tubular member for raising this member and the generally disc-like member to released position against the action of the spring.

Another feature resides in the provision of latch mechanism of the character described having various features of novelty and advantages, and which is characterized by its simplicity in construction, its minimum number of parts, and its effectiveness in use.

Further objects and advantages of the invention will be apparent from the following detailed description taken in connection with the accompanying drawings, it being understood that the invention is limited only within the scope of the appended claims and not to the particular embodiment selected for illustration.

In the drawings:

FIGURE 3 is a diagrammatic view showing one illustrative shift pattern for the shift lever and arrangement of shift knob positions and one general location of the shift lever latch with respect thereto;

FIGURE 4 is a fragmentary view of the shift lever and latch looking in the direction of the arrow A shown in FIGURE 1 and showing the latch in position preventing movement of the lever to position for shifting into low speed or reverse;

Figure 1:
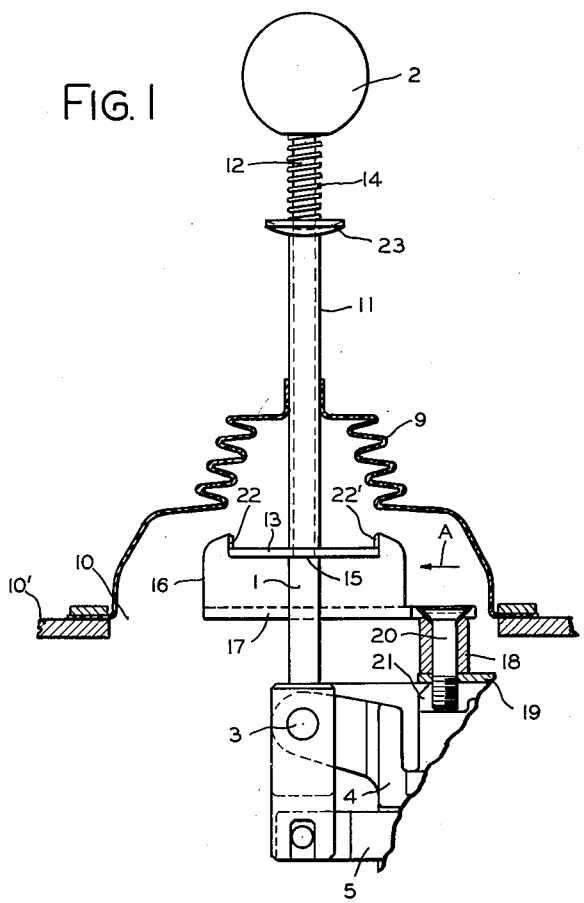
FIGURE 1 is a fragmentary view, partially in section and partially in elevation showing one form of shift lever latch embodying the present invention.

FIGURE 5 is a view similar to FIGURE 4 showing in dotted lines the latch in released position and the lever moved to position for shifting into low speed or reverse, and showing in full lines the manner in which the latch operates to prevent the operator accidentally moving the shift lever from a low or reverse position to the reverse or low position, respectively; and FIGURE 6 is a sectional view taken along the lines 6—6 of FIGURE 5 and showing in top plan the manner in which the latch operates to prevent movement of the shift lever from a low or reverse position to the reverse or low position, respectively.

Referring now to the drawings, in the particular mechanism selected for illustration, the gear shift lever 1 has a hand knob 2 and is disposed for convenient manual manipulation by the operator or driver of the vehicle with which the lever is associated.

Figure 2:
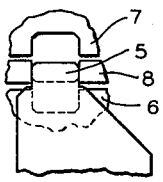
FIGURE 2 is a view showing diagrammatically one arrangement of shift rail lug engaging member with respect to shifter members or shift rails.

Suffice it for the purpose of the present description to state that the lever 1, near its lower end, has pivotal movement about the axis of a pivot pin 3 carried by a member 4 mounted to turn about a shaft 5. With the lever 1 positioned, for example, as illustrated in FIGURE 4 and the latch, to be presently described, released, movement of the shift lever to the right accomplishes movement of a shift rail lug engaging member 5 (FIGURE 2) into the desired relation with respect to shifter means 6, so that then movement of the knob 2 rearwardly to the position marked "Low" in FIGURE 3, provides low speed for the transmission, or movement of the knob 2 forwardly to position marked "High Rev"
"Low Rev"

provides reverse drive through the transmission.

With the lever 1 positioned, for example, as illustrated in FIGURE 4, movement of the same to the left accomplishes movement of shift rail lug engaging member 5 (FIGURE 2) into the desired relation with respect to shifter means 7 so that movement of knob 2 forwardly into position 6
2 or rearwardly into position 3
7 as illustrated diagrammatically in FIGURE 3, affords selected ratios of forward drive. Movement of the lever 1 to position for accomplishing movement of the shift rail lug engaging member 5 into the desired relation with respect to shifter means 8 and shifting of the knob 2 forwardly into position 8
4 or rearwardly into position 5
9 affords further selected ratios of forward drive.

The shift pattern above described is, for example, for certain nine-speed transmissions which comprise a main portion having five speeds forward and reverse and a two-speed auxiliary in series with the main transmission portion. The main transmission is first shifted through its five ratios in the forward direction, then the auxiliary is shifted, and thereafter four of the ratios in the main transmission are repeated. The low, or first position in the main transmission is not repeated because it is not synchronized and is not suitable for shifting into with the vehicle in motion. The two-speed auxiliary also has the effect of multiplying the reverse in the main transmission and providing two reverses. The shift pattern for the shift lever is shown in FIGURE 3.

Shifter mechanism having a shift rail lug engaging member movable into the desired relation with respect to shifter means for low and reverse and other forward ratios is more fully disclosed, in the co-pending application of William F. Leonard, Serial No. 776,511, filed November 26, 1958, now Patent No. 2,969,687 issued January 31, 1961; also in the co-pending application of William F. Leonard, Serial No. 704,978, filed December 24, 1957, now Patent No. 2,926,539 issued March 1, 1960.

The present invention is not, however, limited to use with the particular shift pattern referred to above, nor to any particular number of ratios of drive through the transmission.

A flexible boot of conventional construction, shown at 9, extends between the shift lever 1 and the upper open end of the chamber 10 of the transmission housing 10' to protect the enclosed parts from dust and the like.

The latch means of the present invention is shown as comprising a sleeve or tubular member 11 slidable on the reduced upper portion 12 of the shift lever 1. A circular or generally disc-like latch member 13 is secured or fixed to the lower end of the sleeve 11, and projects laterally therefrom. A coiled spring 14 surrounds the lever 1, and is interposed endwise between the upper end of the sleeve 11 and, for example, the knob 2 on the upper end of the lever. This spring 14 yieldingly urges the sleeve 11 and its latch member 13 downwardly to the position shown in FIGURE 4, for example, against a stop formed by an annular shoulder 15 on the lever 1 by enlargement of the lever 1 below the upper reduced portion 12.

Stop means mounted in proximity to the lever 1 is shown in the form of a bracket 16 turned up from a base 17. The base 17 has, for example, a spacer 18 welded or otherwise secured thereto for spacing the base 17 from a bracket 19. The base 17 of the bracket 16 is secured, for example, to the bracket 19 by a screw 20 or other means, which passes through the base 17, spacer 18 and bracket 19 and secures the base 17 and bracket 16 to a bracket support 21.

As shown in FIGURES 1 and 6, the bracket 16 has a pair of spaced ears 22 and 22'. These ears 22 and 22' project upwardly in spaced relation fore and aft of the upper end of the bracket 16.

As shown in FIGURE 4, the bracket 16 is positioned to coact with the latch member 13 and obstruct or prevent movement of the lever 1 to the right from the position shown in FIGURE 4, when the latch member 13 is in its lower position, to which it is urged by the spring 14.

Secured to the upper end of the sleeve 11, in proximity to the knob 2 is an annular flange or finger-piece 23. With the hand on the knob 2, this finger-piece 23 may be engaged by the fingers and pressed upwardly to raise the sleeve 11 and its latch member 13 to raised position against the action of the spring 14.

When it is desired, with the lever 1 in the position shown in FIGURE 4, to move this lever 1 to the right to position for shifting of the knob 2 rearwardly into low drive position, marked "Low" in FIGURE 3, or forwardly into reverse drive position, marked "Hi Rev"
"Lo Rev"

in the same figure, the operator or driver engages the finger-piece 23 with the fingers and raises the sleeve 11 and latch member 13 to the position shown in dotted lines in FIGURES 4 and 5. The lever 1 may then be moved to the right to the position against the bracket 16, as illustrated in FIGURE 5 and then, for example, rearwardly to knob position "Low" as shown in FIGURE 3. This corresponds to low drive for the transmission. In the aforementioned shifting of the lever rearwardly to knob position "Low," the latch member 13 is above and rides on the tops of the spaced ears 22 and 22'. The "Low" position of the latch member 13 is shown in dotted lines in FIGURE 6.

When the shift lever is moved from knob position "Low" toward reverse position, or knob position "Hi Rev"
"Lo Rev"

the spring 14 urges the sleeve 11 downwardly, and causes the latch member 13 on the sleeve 11 to enter the position shown in full lines in FIGURES 5 and 6 between the ears 22 and 22'. In this position, the latch member 13, by coaction with the ear 22, prevents the operator from accidentally shifting the lever to reverse knob position, or knob position "Hi Rev"
"Lo Rev"

When the shift lever is in reverse knob position, or knob position

"Hi Rev"
"Lo Rev"

and is moved from such position toward low speed position, or knob position "Low," the spring 14 urges the sleeve 11 downwardly and causes the latch member 13 to enter the position shown in full lines in FIGURES 5 and 6 between the ears 22 and 22'. In this position, the latch member 13, by coaction with the ear 22', prevents the operator from accidentally shifting the lever to "Low" position.

From the foregoing, it will be apparent that the latch mechanism of the present invention is operative, unless released, firstly, to prevent movement of the shift lever 1 laterally to position for shifting, for example, to the low drive or reverse drive positions, and, secondly, is operative when the shift lever is in either the low position or the reverse position, to prevent the operator from accidentally shifting the lever to the reverse position or to low position, respectively.

The embodiment of the invention disclosed in the drawings and the specification is for illustrative purposes only, and it is to be expressly understood that the drawings and specification are not to be construed as a definition of the limits or scope of the invention, reference being had to the appended claims for that purpose.

I claim:

1. In mechanism of the class described, in combination, a shift lever movable to different positions affording different drives, stop means mounted in proximity to said lever and including a pair of spaced stop portions, a tubular member slidable on said lever and including a generally disc-like member having a first latching position for coaction with said stop means to prevent movement of said lever to position for shifting into different drive positions and a second latching position between said spaced stop portions, a hand knob on the upper end of said lever, and a coiled spring surrounding said lever and interposed endwise between said knob and said tubular member yieldingly to urge said generally disc-like member to its first and second latching positions.

2. A mechanism according to claim 1, wherein there is a laterally projecting finger-piece on said tubular member in proximity to said hand knob for raising said member and its generally disc-like member to released position against the action of said spring.

3. In mechanism of the class described, in combination, a shift lever having selecting movement from a neutral position into cooperation with different shifter members and movement to different drive positions in paths across the path of selecting movement, stop means mounted in proximity to said lever and including a pair of spaced stop portions, latch means carried by said lever and having a first latching position in which said lever is obstructed by said stop means from selecting movement from said neutral position, said latch means being movable to position clear of said stop means to permit selecting movement of said lever from neutral position, and means yieldingly urging said latch means to said first latching position and to a second latching position between said spaced stop portions as said lever is shifted in a path across the path of selecting movement to prevent accidental movement of said lever from a drive position at one end of said cross path to a different drive position at the other end of said cross path.

4. A mechanism according to claim 3, wherein the drive position at one end of said last recited cross path affords a low speed drive and the drive position at the opposite end of said cross path affords reverse drive.

5. In mechanism of the class described, in combination, a shift lever movable to different positions affording different drives, stop means mounted in proximity to said lever and including a pair of spaced stop portions, latch means carried by said lever and having a first latching position in which said lever is obstructed by said stop means from movement to position for shifting into said different drive positions, said latch means being movable to position clear of said stop means to permit movement of said lever to position for shifting into said different drive positions, and means yieldingly urging said latch means to said first latching position and to a second latching position between said spaced stop portions as said lever is shifted from one of said different drive positions to prevent accidental movement of said lever to the other of said different drive positions, said latch means being in the form of a tubular member slidable on said shift lever and including a generally disc-like member for coaction with said stop means in the first latching position of said latch means, and for positioning between said stop portions in the second latching position of said latch means.

6. In mechanism of the class described, in combination, a shift lever movable to different positions affording different drives, stop means mounted in proximity to said lever and including a pair of spaced stop portions, latch means carried by said lever and having a first latching position in which said lever is obstructed by said stop means from movement to position for shifting into said different drive positions, said latch means being movable to position clear of said stop means to permit movement of said lever to position for shifting into said different drive positions, means yieldingly urging said latch means to said first latching position and to a second latching position between said spaced stop portions as said lever is shifted from one of said different drive positions to prevent accidental movement of said lever to the other of said different drive positions, said stop means being in the form of a bracket mounted to coact with said latch means when in its latching position, and a pair of spaced ears on said bracket affording the spaced stop portions between which said latch means is disposed in its second latching position.

7. In mechanism of the class described, in combination, a shift lever movable to different positions affording different drives, a pair of spaced stop portions, a tubular member slidable on said lever and including a generally disk-like member having a latching position between said spaced stop portions as said lever is moved from one of said different drive positions to prevent accidental movement of said lever to the other of said different drive positions, a coiled spring surrounding said lever and acting endwise on said tubular member yieldingly to urge said generally disc-like member to said latching position, a hand knob on the upper end of said lever, and a laterally projecting finger-piece on said tubular member in proximity to said hand knob for raising said member and its generally disc-like member to released position against the action of the spring.

8. In mechanism of the class described, in combination, a shift lever having selecting movement from a neutral position into cooperation with different shifter members and movement to different drive positions in paths across the path of selecting movement, stop means mounted in proximity to said lever and including a pair of spaced stop portions, latch means carried by said lever and having a first latching position in which said lever is obstructed by said stop means from selecting movement from said neutral position, said latch means being movable to position clear of said stop means to permit selecting movement of said lever from neutral position, means yieldingly urging said latch means to said first latching position and to a second latching position between said spaced stop portions as said lever is shifted in a path across the path of selecting movement to prevent accidental movement of said lever from a drive position at one end of said cross path to a different drive position at the other end of said cross path, and means associated with said lever and manually operable to release the latch means carried by said lever from position between said spaced stop portions to permit movement of the lever to one of the drive positions at the ends of one of said cross paths.

9. A mechanism according to claim 8, wherein the latch means carried by the shift lever forms part of a tubular member slidable on said lever, a coiled spring surrounding said lever and acting endwise on said tubular member yieldingly to urge the latch means carried by the lever to said latching position, and a fingerpiece on said tubular member for raising said member and the latch means carried thereby to released position against the action of said spring.

References Cited in the file of this patent

UNITED STATES PATENTS

| | | |
|---|---|---|
| 1,909,889 | Peterson | May 16, 1933 |
| 2,917,941 | Wittren | Dec. 22, 1959 |